United States Patent Office 3,769,371
Patented Oct. 30, 1973

3,769,371
FLUOROCARBON POLYMER BLEND AND VULCANIZATES THEREOF
Arthur Nersasian, Wilmington, Del., assignor to E. I. du Pont de Nemours and Company, Wilmington, Del.
No Drawing. Filed Oct. 23, 1969, Ser. No. 868,921
Int. Cl. C08f 29/22
U.S. Cl. 260—900
2 Claims

ABSTRACT OF THE DISCLOSURE

An elastomer comprising a blend of 2–50 parts by weight of poly(vinylidene fluoride) with 100 parts by weight of a saturated elastomeric copolymer of vinylidene fluoride and at least one other ethylenically unsaturated fluorinated monomer. These elastomeric compositions exhibit enhanced curability, and vulcanizates therefrom have improved physical properties.

BACKGROUND OF THE INVENTION

Elastomeric copolymers of vinylidene fluoride and at least one other ethylenically unsaturated fluorinated monomer, said copolymers hereinafter referred to as vinylidene fluoride copolymers, are known to withstand high temperatures and to simultaneously retain good mechanical properties better than other elastomers. Because of these exceptional properties said vinylidene fluoride copolymers are used in a wide variety of high temperature applications. For example, O-rings made from said copolymers are employed to seal lubricants for high-speed bearings in jet engines where temperatures reach 600° F. Despite their excellent properties, such vinylidene fluoride copolymer elastomers do, after prolonged exposure to high temperatures, suffer a deterioration in mechanical properties, such as, for example, elongation and consequently tend to become brittle, and it is therefore desirable to improve elongation properties and high temperature life of such vinylidene copolymer elastomeric compositions.

THE INVENTION

In accordance with this invention, there is provided a novel elastomeric composition, having enhanced curability, and which results in vulcanizates having improved physical properties which consist essentially of a uniform blend of about 2–50 parts by weight of poly(vinylidene fluoride) with 100 parts by weight of a saturated fluorocarbon elastomeric copolymer of vinylidene fluoride and at least one other ethylenically unsaturated fluorinated monomer. As used herein the term "saturated" means the substantial absence of addition-polymerizable carbon-to-carbon double bonds; it does not preclude the presence of small amounts (e.g., up to about 5 weight percent) of perfluoroaromatic side chain groups (e.g., perfluorophenyl) on the polymer. For example, interpolymers of vinylidene fluoride, ethylene and perfluoro(alkyl vinyl ethers) can have up to about 5 weight percent of units of perfluoro(2-phenoxypropyl vinyl ether) present. These elastomeric compositions, when cured, display markedly improved elongation properties as compared with cured vinylidene fluoride copolymer compositions containing conventional fillers. The improvement in elongation properties is maintained during exposure of the cured elastomer to elevated temperatures and is obtained without any significant sacrifice of other desirable elastomeric properties of the cured elastomer. In addition, these elastomeric compositions, when cured under certain conditions hereinafter described, display improvements in other physical properties such as, for example, compression set.

Vinylidene fluoride copolymers which are especially useful in this invention include saturated interpolymers of vinylidene fluoride ($VF_2$) with at least one other ethylenically unsaturated polyfluorinated monomer which contains about two to about six carbon atoms and in which at least about one-half of the available hydrogen atoms are replaced by fluorine atoms. Typical of the latter are hexafluoropropene (HFP), tetrafluoroethylene (TFE), perfluoroalkyl perfluorovinyl ethers [particularly where the alkyl radical contains from one to about four carbon atoms such as perfluoro(methyl vinyl ether) and perfluoro(propyl vinyl ether)], trifluorochloroethylene and pentafluoropropylene. Of particular interest are the vinylidene fluoride/hexafluoropropene copolymers containing from about 70 to about 30 weight percent vinylidene fluoride and about 30 to about 70 weight percent hexafluoropropene as disclosed in U.S. Patent 3,051,677 to Rexford. Other polymers useful in this invention are the terpolymers of vinylidene fluoride/hexafluoropropene/tetrafluoroethylene wherein the monomer units are present in the following mole ratios: about 3 to 35 (preferably 15 to 25) weight percent tetrafluoroethylene units and about 97 to 65 (preferably 85 to 75 weight percent vinylidene fluoride and hexafluoropropene units, the latter two being present in a weight ratio of from about 2.3:1 to 0.6:1 as disclosed in U.S. Patent 2,968,649.

Poly(vinylidene fluoride) homopolymers which are particularly useful in this invention include polymers having a molecular weight of at least about 100,000. Poly(vinylidene fluoride) polymers which are preferred for use in this invention include polymers having molecular weights of from about 250,000 to about 650,000 and which are in the form of free flowing, non-hygroscopic powders. Poly(vinylidene fluoride) polymers which are most preferred for use in this invention are free flowing, non-hygroscopic, crystalline powders which contain about 59 weight percent fluorine and which have molecular weights of from about 300,000 to about 600,000.

The compositions of the present invention are made by mixing poly(vinylidene fluoride) and vinylidene fluoride copolymer in any convenient manner which will produce a uniform mixture. This can be accomplished by the use of conventional rubber compounding machinery, such as Banbury mixers or rubber mills. Another method of preparation involves mixing a dispersion of the poly(vinylidene fluoride) with a vinylidene fluoride copolymer latex whereby the poly(vinylidene fluoride) becomes intimately mixed with the vinylidene fluoride copolymer when the latex is coagulated. Still another method involves polymerizing the monomers to form the vinylidene fluoride copolymer in the presence of a dispersion of poly(vinylidene fluoride). Conveniently, the poly(vinylidene fluoride) can be mixed with the vinylidene fluoride copolymer during regular compounding operations wherein one or more other conventional additives, antioxidants, pigments, etc., are added. The latter are not necessary, however, to gain the advantages of this invention.

The poly(vinylidene fluoride) is mixed with the vinylidene fluoride copolymer in amounts of about 2–50 phr. (parts by weight per 100 parts by weight of said copolymer) and preferably in an amount of about 10–30 phr. When less than about 2 phr. of poly(vinylidene fluoride) is used, there is no significant improvement in the properties of the compositions of this invention. As the concentration of polyvinylidene fluoride is increased above about 50 phr., the properties of the poly(vinylidene fluoride)/vinylidene fluoride copolymer composition begin to deteriorate.

The novel elastomeric compositions of this invention, after curing, display physical properties superior to those displayed by vinylidene fluoride copolymer vulcanizates per se and to those displayed by vulcanizate compositions of vinylidene fluoride copolymer and conventional filler. The vulcanizates of the present invention display improved elongation properties and prolonged high temperature life. Curing of the elastomeric compositions of this invention is effected by conventional methods and under the usual conditions. A preferred curing agent for use with the compositions of the present invention is hydroquinone. When hydroquinone is employed as a curing agent of compositions of this invention, the vulcanizates of this invention exhibit lower compression set in addition to the improved properties hereinbefore described.

The following examples illustrate the invention. All parts, percentages and proportions are by weight unless otherwise indicated.

EXAMPLE

A crystalline, non-hydroscopic, free-flowing poly(vinylidene fluoride) polymer having a molecular weight of from about 300,000 to about 600,000 and with 59 weight percent fluoride, is added to a saturated fluorocarbon elastomeric copolymer of vinylidene fluoride and at least one other ethylenically unsaturated fluorinated monomer (identified below) on a cool 2-roll rubber mill and then the other compounding ingredients are added consecutively. This mixture is compounded to uniformity and sheeted.

Thereafter, vulcanizates are prepared by compression molding of appropriate samples in a press for 30 minutes at 149° C. followed by removing them from the mold and "postcuring" by heating in an air oven to a temperature of from about 204° C. to about 232° C. over a 4-hour period and then maintaining the samples at said temperature for an additional 24 hours. In order to determine durability, some samples are heated for an additional period of 3 days at about 260–288° C. Physical and mechanical properties of the various sample vulcanizates are then determined. Tensile stress at 100% elongation, tensile at break and elongation at break are determined in accordance with the standard method of tension testing of the American Society for Testing and Materials (ASTM) which method has the ASTM designation of D412–68. Hardness is determined in accordance with the standard method having the ASTM designation of D2240–68. Compression set is determined in accordance with standard Method B having the ASTM designation of D395–68. The results are given in the table.

TABLE
Properties of vulcanizates

|  | A[1] | B[1] | C | D[1] | E | F | G[1] | H[1] | I | J |
|---|---|---|---|---|---|---|---|---|---|---|
| Parts by weight: | | | | | | | | | | |
| Copolymer A | 100 | 100 | 100 | 100 | 100 | 100 | | | | |
| Copolymer B | | | | | | | 100 | 100 | 100 | 100 |
| Magnesium oxide | 10 | 10 | 10 | 10 | 10 | 10 | 10 | 10 | 10 | 10 |
| MT carbon black | 30 | | | 20 | | | 20 | | | |
| Poly(vinyl fluoride) | | 30 | | | | | | 20 | | |
| Poly(vinylidene fluoride) | | | 30 | | 20 | 30 | | | 10 | 20 |
| Curing agent No. 1 | 1.5 | 1.5 | 1.5 | | | | | | | |
| Dicyclohexyl-18-crown-6 | | | | 2 | 2 | 2 | 2 | 2 | 2 | 2 |
| Curing agent No. 5 | | | | 1.5 | 1.5 | 1.5 | 1.5 | 1.5 | 1.5 | 1.5 |
| Sodium stearate | | | | 0.5 | 0.5 | 0.5 | 0.5 | 0.5 | 0.5 | 0.5 |
| Properties after 30 min./149° C. cure plus postcure [2] | | | | | | | | | | |
| Tensile stress at 100% elongation (p.s.i.) | 650 | 1,150 | 1,000 | 775 | 700 | 850 | 750 | 1,140 | 700 | 600 |
| Tensile at break (p.s.i.) | 2,750 | 2,250 | 2,450 | 2,050 | 2,325 | 2,300 | 2,250 | 2,810 | 2,440 | 2,500 |
| Elongation at break, percent | 220 | 230 | 280 | 190 | 250 | 270 | 190 | 230 | 245 | 280 |
| Hardness (durometer A) | 74 | 80 | 75 | 72 | 73 | 72 | 73 | 72 | 70 | 72 |
| Compression set B 70 hr./204° C. (percent) | 65 | 82 | 65 | 21 | 15 | 16 | 41 | 37 | 33 | 32 |
| Properties after above cure plus 3 days heat aging at 260–288° C.[3] | | | | | | | | | | |
| Tensile stress at 100% elongation (p.s.i.) | 1,275 | | 1,450 | 865 | 800 | 940 | 550 | 400 | 450 | 425 |
| Tensile at break (p.s.i.) | 2,250 | 1,600 | 2,200 | 2,050 | 2,100 | 2,075 | 1,220 | 900 | 1,310 | 1,225 |
| Elongation at break (percent) | 180 | 80 | 210 | 185 | 240 | 280 | 270 | 150 | 280 | 325 |
| Hardness (durometer A) | 78 | 83 | 79 | 76 | 74 | 77 | 70 | 68 | 68 | 74 |

[1] Outside invention. For comparison only.
[2] Samples A, B, C, G, H, I and J are postcured for 4 hours to 240° C. Samples D, E and F are postcured for 4 hours to 232° C. plus 24 hours at 232° C.
[3] Samples A, B, C, D, E and F are heat aged 3 days at 260° C. Samples G, H, I and J are heat aged 3 days at 288° C.

In the table, Copolymer A is a copolymer containing about 60% by weight of vinylidene fluoride units and about 40% by weight of hexafluoropropene units.

Copolymer B is a terpolymer containing about 45% by weight of vinylidene fluoride units, about 30% by weight of hexafluoropropene units, and about 25% by weight of tetrafluoroethylene units.

MT carbon black is a medium thermal carbon black.
Curing agent 1 is hexamethylenediamine carbamate.
Dicyclohexyl-18-Crown-6 is a compound having the following structural formula:

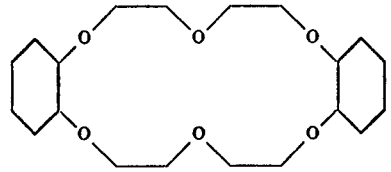

A process for the preparation of this compound is found in JACS 89, 7017 (1967).

Curing agent No. 5 is hydroquinone.

The data in the table clearly show that:

(a) The vulcanizates of the compositions of the present invention display elongation properties superior to those displayed by vulcanizates of compositions containing conventional fillers such as carbon black or poly(vinyl fluoride) (compare Run C with Runs A[1] and B[1], Runs E and F with Run D[1] and Runs I and J with Runs G[1] and H[1]);

(b) When the compositions of the present invention are cured with hydroquinone as the curing agent the vulcanizates exhibit, in addition to superior elongation properties, a marked resistance to compression set (compare Runs E and F with Run D[1] and Runs I and J with G[1] and H[1]).

(c) The improvement in elongation properties is maintained during prolonged exposure to elevated temperatures (see properties after cure plus 3 days seat aging) and is obtained without any significant sacrifice of other desirable elastomeric properties such as tensile stress at 100% elongation, tensile at break and hardness.

What is claimed is:
1. An elastomeric composition which consists essentially of a uniform blend of about 2–50 parts by weight of poly(vinylidine fluoride) and about 100 parts by weight of a saturated fluorocarbon elastomeric copolymer wherein the copolymer is a terpolymer of vinylidene fluoride/hexafluoropropene/tetrafluoroethylene wherein the monomer units are present in the following ratios: about 3–35 weight percent tetrafluoroethylene units and about 97–65 weight percent vinylidene fluoride and hexafluoropropene units, the latter two being present in a weight ratio of about 2.3/1 to about 0.6/1.

2. An elastomeric composition which consists essentially of a uniform blend of about 2–50 parts by weight of poly(vinylidine fluoride) and about 100 parts by weight of a saturated fluorocarbon elastomeric copolymer wherein the copolymer is a terpolymer of vinylidene fluoride/hexafluoropropene/tetrafluoroethylene containing about 45% by weight of vinylidene fluoride, 30% by weight of hexafluoropropene and 25% by weight of tetrafluoroethylene.

References Cited
UNITED STATES PATENTS

| | | | |
|---|---|---|---|
| 3,019,206 | 1/1962 | Robb | 260—29.6 |
| 3,075,939 | 1/1963 | Bauer et al. | 260—30.4 |

FOREIGN PATENTS

| | | | |
|---|---|---|---|
| 655,193 | 1/1963 | Canada | 260—900 |

MURRAY TILLMAN, Primary Examiner

J. SEIBERT, Assistant Examiner.

U.S. Cl. X.R.

260—29.6 F, 41 B, 41 C, 884, 897 C, 899